United States Patent [19]

Sasaki et al.

[11] Patent Number: 4,831,611
[45] Date of Patent: May 16, 1989

[54] OPTICAL WRITING AND READING METHOD AND APPARATUS

[75] Inventors: Masateru Sasaki, Yokohama; Yuji Inouye, Kawasaki, both of Japan

[73] Assignee: Fujitsu Limited, Kawasaki, Japan

[21] Appl. No.: 909,334

[22] Filed: Sep. 19, 1986

[30] Foreign Application Priority Data

Sep. 20, 1985 [JP] Japan .................................. 60-208201

[51] Int. Cl.⁴ .............................................. G11B 7/00
[52] U.S. Cl. ....................................... 369/58; 369/54; 369/116
[58] Field of Search ......................... 369/44, 45, 46, 54, 369/58, 32, 111, 116; 365/215; 360/60; 358/342

[56] References Cited

U.S. PATENT DOCUMENTS

| | | | |
|---|---|---|---|
| 4,225,873 | 9/1980 | Winslow | 358/342 |
| 4,271,334 | 6/1981 | Yardy | 369/44 |
| 4,308,612 | 12/1981 | Miyauchi et al. | 369/48 |
| 4,494,226 | 1/1986 | Hazel et al. | 369/45 |
| 4,546,462 | 10/1985 | Koishi et al. | 369/58 |
| 4,606,016 | 8/1986 | Verboom et al. | 369/58 |
| 4,630,252 | 12/1986 | Miura et al. | 369/44 |
| 4,631,706 | 12/1985 | Batalden et al. | 365/215 |
| 4,695,993 | 9/1987 | Takagi et al. | 369/58 |

*Primary Examiner*—Robert L. Richardson
*Attorney, Agent, or Firm*—Staas & Halsey

[57] ABSTRACT

An optical writing and reading method and apparatus for writing data on a recording medium. To prevent an over-writing of data, a mark is written to indicate that data is already written. Before writing data, a mark is written on a mark recording region. Simultaneously with the writing of the mark, the light quantity reflected from the mark recording region is detected. When the reflected light quantity indicates that data is already written, subsequent data writing is inhibited.

23 Claims, 23 Drawing Sheets

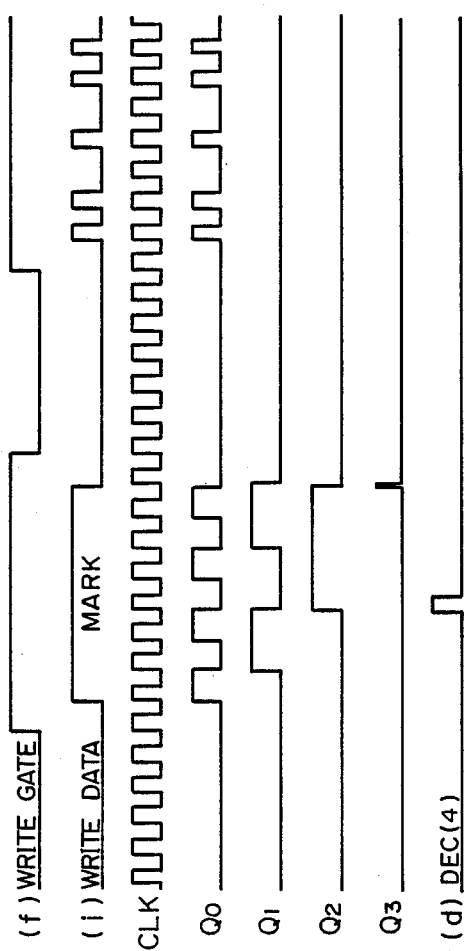

OPTICAL WRITING AND READING METHOD AND APPARATUS

BACKGROUND OF THE INVENTION

1. Field of the Invention

The present invention relates to an optical writing and reading method and apparatus for writing data to or reading data from a recording medium by optical means. More particularly, it relates to an optical writing and reading method and an optical writing and reading apparatus providing an effective discrimination process for preventing an over write onto a medium on which data has been already written.

2. Description of the Related Art

An optical disc unit is well known as an optical reading and writing apparatus. An optical disc unit acting as an external large capacity storage unit for use with a data processing unit, has a high density recording availability ten times or more higher than a conventionally used magnetic disc unit. Also, long term data storage is possible with the optical disc unit because the writing of data to the optical disc unit is carried out by, for example, opening a hole (pit) by thermal reaction caused by irradiating a light beam onto an optical disc medium. That is, by strongly focusing a laser beam on the recording material, a pit (hole) is thermally formed through the recording film (Note: there are other methods of modifying the recording film) so that data is written therein.

Accordingly, if new data is written onto the recording film in which pits (holes) are already formed, both the new data and the already written data are destroyed. Therefore, in one of the conventional methods to prevent an over writing to an already written region, after data is written, a mark indicating that data has been written (hereinafter this mark is referred to as a write mark) is made on the region immediately before the region where the data was written. Therefore, two rotations of the disc medium are necessary to write the data and the write mark.

Because of the increased frequency of use of such an optical writing and reading apparatus, there is a strong demand for the provision of a method by which over writing will be prevented and an efficient and accurate discrimination can be made of whether or not the data write-in region has data written thereon.

SUMMARY OF THE INVENTION

An object of the present invention is to provide an optical writing and reading method and apparatus in which the write mark and the data are accurately and efficiently written by one rotation of the disc medium.

To attain the above object, according to the present invention, there is provided an optical writing and reading method for writing a mark and data on each recording section of a recording medium. The recording section has a mark recording region and a data recording region. The mark indicates that data is already written on the data recording region.

The method comprises the steps of:
irradiating light on the mark recording region to write a mark,
discriminating, during the irradiating step for writing a mark, whether or not a mark is already written on the mark recording region, by comparing the light quantity reflected from the mark recording region with a reference value, and
inhibiting subsequent writing of data when it is discriminated in the discriminating step that a mark is already written on the mark recording region.

According to the present invention, there is also provided an optical writing and reading apparatus comprising:
a recording medium having a plurality of recording sections, each recording section having a mark recording region and a data recording region, the mark indicating that data is a already written on the data recording region;
a light irradiating means operatively receiving the mark and the data to irradiate light on the recording medium for writing the mark and the data;
a light detecting means for detecting a light quantity reflected from the recording medium during writing of the mark;
a light-voltage converting means for converting the reflected light quantity into a detected voltage;
a reference voltage generating means for generating a reference voltage corresponding to a predetermined reflected light quantity;
a comparing means, operatively connected to receive the detected voltage and the reference voltage, and comparing the detected voltage with the reference voltage to provide an output signal; and indicating whether or not a mark is already written in the mark recording region; and
a gate means, operatively connected to receive the output signal of the comparing means and the data, for inhibiting, depending on the output signal, the supply of data to the light irradiating means.

BRIEF DESCRIPTION OF THE DRAWINGS

The above objects and features of the present invention will be more apparent from the following description of the preferred embodiments with reference to the accompanying drawings, wherein:

FIG. 10 is a circuit diagram of the peripheral circuit of the latching circuit 5 and the AND gate 6 shown in FIG. 5;

FIG. 11 is a waveform diagram explaining the operation of the circuit shown in FIG. 9;

DESCRIPTION OF THE PREFERRED EMBODIMENTS

For a better understanding of the present invention, a conventional optical writing and reading method and apparatus will be first described with reference to FIGS. 1 and 2.

Figure 1:
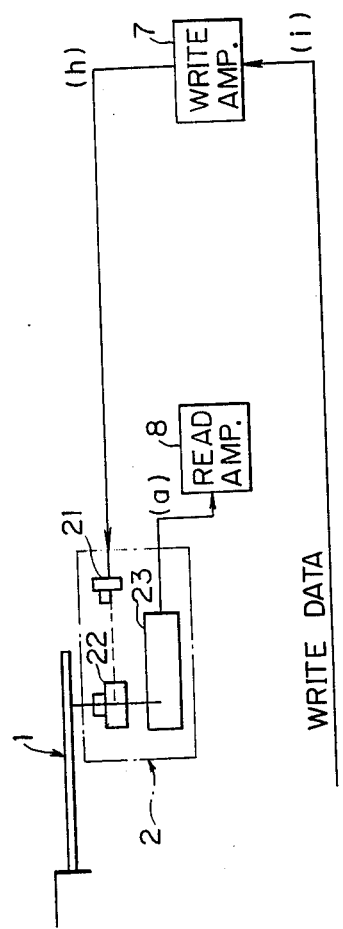
FIG. 1 is a block diagram of a conventional example of an optical writing and reading apparatus.
Figure 2:
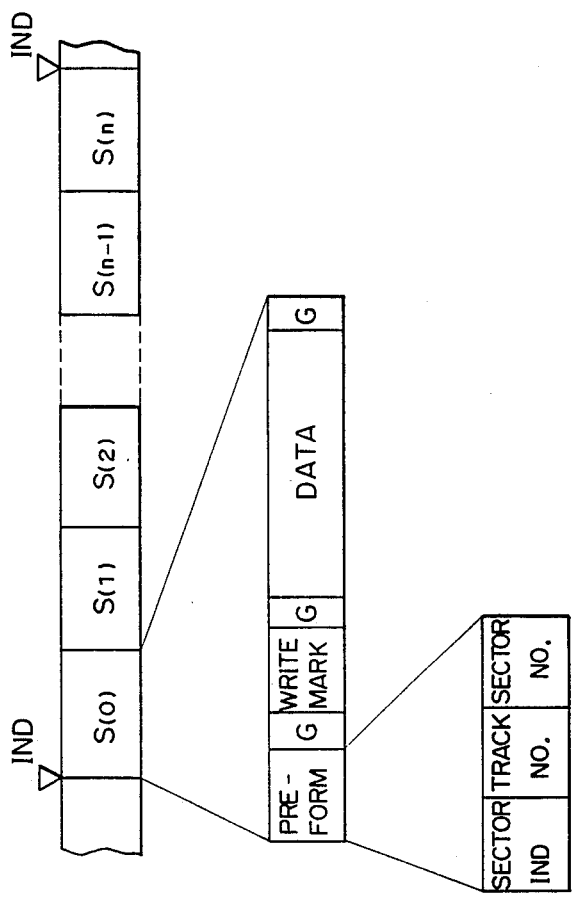
FIG. 2 is a diagram explaining an example of a data format written on a recording medium.

FIG. 1 is a block diagram of a conventional example of an optical writing and reading apparatus, and FIG. 2 is a diagram of an example of a data format on a recording medium.

FIG. 1 illustrates a part of a WORM type optical disc unit, which includes an optical disc medium 1 through which pits (holes) are optically formed on a recording film to write data; an optical head 2 for radiating light, in a quantity determined by the level of an electric signal from a write amplifier 7; a write amplifier 7 for converting data to be written on the optical disc medium 1 into a predetermined electric signal to access the optical head 2; and a read amplifier 8 for amplifying the reflected light quantity of the irradiated light quantity on the optical disc medium 1.

The optical head 2 includes a laser diode (hereinafter referred to as an LD) 21 for emitting light upon access by the electric signal; laser optics including a polarization beam split prism 22 for forming an optical beam from the laser light emitted from the LD21 and for radiating the optical beam onto the optical disc medium 1; and a photo-detecting portion 23 for detecting the reflected light quantity and converting same into an electric signal.

The laser light emitted from the LD21 is radiated onto the optical disc medium 1 as a small spot having a diameter of about 0.6 through 1.5 $\mu$m. The pit (hole) thus formed has a diameter of about 0.6 through 1.0 $\mu$m.

When data is written by forming the pits (holes), the power output of the LD21 received at the recording film is about 5 through 10 milliwatts, and during the reading of data, the power output received at the recording film is about 0.5 through 2 milliwatts.

In both data writing and data reading, the change of reflected light quantity from the optical disc medium 1, of the irradiated laser light, is detected by the photo detecting portion 23, and is converted into an electric signal having a detected signal voltage (a).

That is, during data writing, the LD21 is oscillated at a high output (several tens of milliwatts) so that the light quantity of the laser light is changed in accordance with the LD control signal (h) output from the write amplifier 7, which has received write date (i), whereby a pit (hole) is made on the optical disc medium 1.

On the other hand, during data reading, the LD21 is continuously oscillated at several milliwatts, and the reflected light quantity from the surface of the optical disc medium 1 is introduced to the photo detecting portion 23 through the polarization beam split prism 22, and thus, the data is read.

An example of a data format when data is written on such an optical disc medium 1, is shown in FIG. 2. Figure shows a data format when a fixed length data is to be written, and between index marks IND, is divided into a plurality of sectors S(0)-S(n).

In each of the sectors S(0)-S(n), a sector index mark, a track number, ana a sector number are previously written at the header portion (preformat); and following this preformat, a write mark recording region and data (information) recording region are provided with gaps G therebetween.

Conventionally, when new write data (i) is to be written in a certain sector S(i), the optical head 2 is positioned at the sector position to which the data is to be written. Then, by reading the mark recording region by a relatively weak laser beam for reading through the read amplifier 8, if it is acknowledged that a write mark is not recorded, the write data (i) is written at the subsequent data recording region in that sector by a relatively strong laser beam for writing. The weak or strong laser beam is radiated from the LD21. The write amplifier 7 generates a control signal (h) for controlling the output power of the LD21 in response to the write data (i).

After the data is written into the sector S(i), one rotation of the optical disc medium 1 is conventionally required for recording a write mark on the write mark recording region in that sector. Thus, a write mark is recorded at the write mark recording region in the sector S(i) where the data writing has been completed.

The write mark is written with a mark of about 5 bytes which are all "1" by modified frequency modulation (MFM) and so forth. In the conventional method, to prevent an erroneous (over writing) of data to the already recorded sector, a write mark is written in the already recorded sector one rotation after the data is written in the sector.

Before writing data, a discrimination is made of whether or not a write mark is already written on the sector. Data is written after it is determined that there is no data written in that recording region. Then, one rotation after the data is written, a write mark is written at the header of the sector.

Therefore, in the conventional method, data writing requires at least two rotations of the disc medium 1, lowering the recording speed thereof.

Now, embodiments of the present invention will be described.

Figure 3:
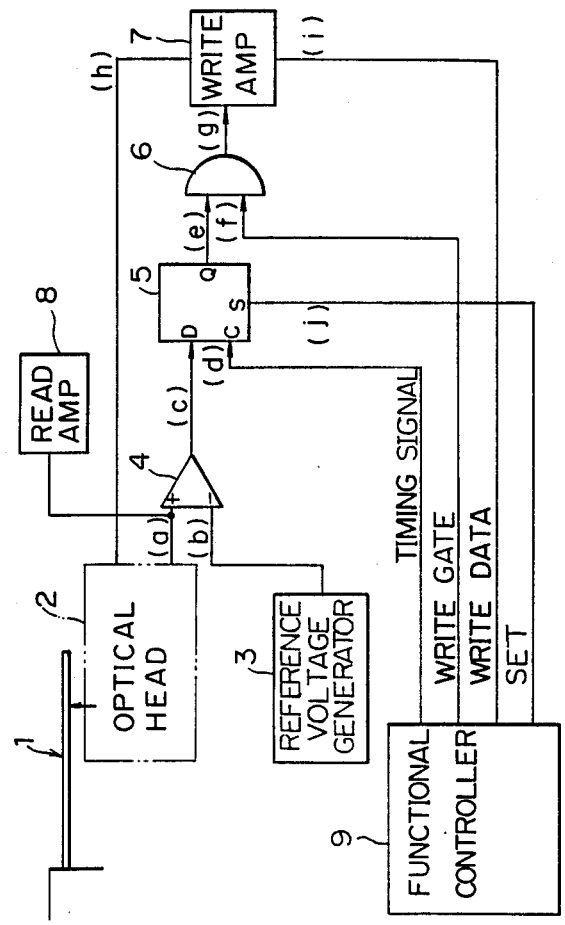
FIG. 3 is a block diagram explaining the principle of an optical writing and reading unit according to the present invention.

FIG. 3 is a block diagram explaining the principle of an optical writing and reading unit according to the present invention.

The optical writing and reading unit shown in FIG. 3 includes an optical disc medium 1, optical head 2, write amplifier 7, and rear amplifier 8, which are the same as those in the conventional example shown in FIG. 1.

The unit in FIG. 3 further includes:
- a reference voltage generating circuit 3 for generating a reference voltage (b) to be compared with the output voltage (a) of the optical head 2 based on the reflected light quantity from the optical disc medium 1;
- a comparing circuit 4 for comparing the voltage (a) and the voltage (b) and output a compared state signal (c);
- a latching circuit 5 for latching the signal (c) in response to a latch timing (d), and
- a gate circuit 6 for gating a data write gate (f) depending on the output signal (e) from the latching circuit 5.

When data is to be written on the data recording region of the medium 1, a write mark is first written by an erase mark on a region immediately preceding the data recording region. The erase mark is a mark having a size longer than a pit (hole) for data. The erase mark is written by continuously irradiating light on the disc medium 1. By detecting, during writing the erase mark, the intensity of the reflected light from the mark recording region on the disc medium 1, a discrimination is made of whether or not data has been written into that data recording region.

Thus, the data write-in and writing of the mark can be carried out easily and accurately by only one rotation of the disc medium 1, and by a simple circuit construction, whether or not data is already written in the data recording region can be easily discriminated.

First Embodiment

Figure 4:
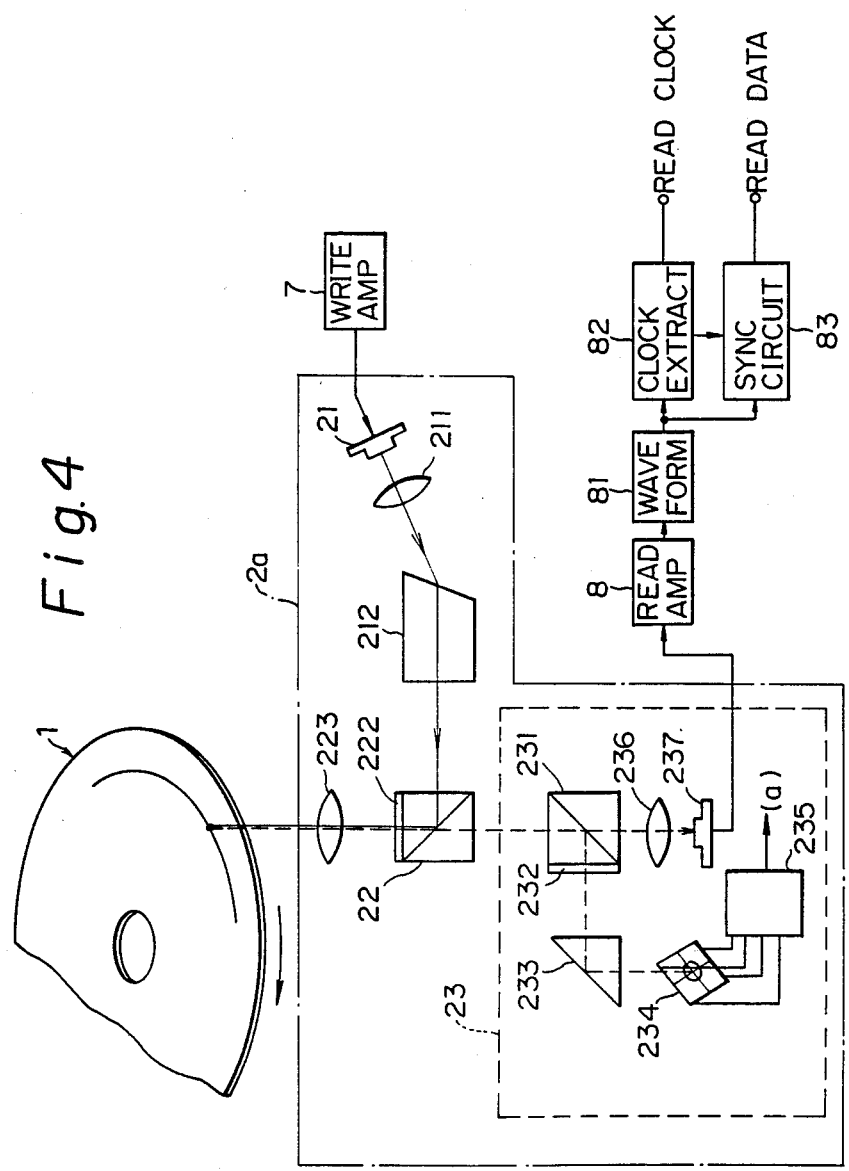
FIG. 4 is a system diagram of an optical writing and reading apparatus, according to a first embodiment of the present invention.

FIG. 4 is a system diagram of an optical writing and reading apparatus according to a first embodiment of the present invention. In FIG. 4, the system is a one-beam type in which a write beam and a read beam are irradiated from only one laser diode with different light source powers. The system includes a disc medium 1, optical head 2a, read amplifier 8, and write amplifier 7, which correspond to those shown in FIG. 3. The system further includes a waveform shaping circuit 81, connected to the output of the read amplifier 8, to obtain read data pulses, and a clock signal extracting circuit 82 and a synchronizing circuit 83 are connected to the output of the waveform shaping circuit 81. A read clock signal is obtained from the output of the clock signal extracting circuit 82. A read data, synchronized with the read clock signal from the clock signal extracting circuit 82, is obtained from the output of the synchronizing circuit 83.

The optical head 2a in FIG. 4 includes a laser diode 21, a polarization beam split prism 22, and a photo detecting portion 23. A collimate lens 211 and a prism 212 are inserted along the path between the laser diode 21 and the polarization beam split prism 22. The polarization beam split prism 22 includes a quarter wave plate 222. An objective lens 223 for focusing the laser beam is inserted along the path between the beam split prism 22 and the optical disc medium 1. The photo detecting portion 23 includes a half mirror 231, a quarter wave plate 232, a prism 233, a quad photo detector 234, a reflected-light quantity detecting unit 235 for converting currents to voltage, a condenser lens 236, and an RF detector 237 for a reading operation.

In a write operation, the write amplifier 7 provides an electric write signal of the laser diode 21, which converts the electric write signal to a write laser beam having a relatively high power. The write laser beam passes through the collimate lens 211, the prism 212, the polarization beam split prism 22, the quarter wave plate 222, and the objective lens 223 to reach the surface of the disc medium 1. When the write beam is irradiated on the disc medium 1, a write mark is first written. If another write mark is already written on the same region of the disc medium 1 as the region now being accessed, the reflected light beam has a light quantity different from that when a write mark is not written on that region. For example, if a write mark is an erase mark having a larger hole size, the reflected light quantity from the write mark is very small in comparison with the reflected light quantity from an area where a write mark is not written. According to the present invention, before writing data on a data recording region of a certain sector S(i) (FIG. 2), the writing of the write mark and the discrimination of whether a write mark is already written are simultaneously carried out, before writing data on the same sector, by detecting the reflected light quantity. The reflected light beam from the disc medium 1 passes through the objective lens 223, the quarter wave plate 222 and the polarization beam split prism 22, the half mirror 231, the quarter wave plate 232, the prism 233, and the quad photo detector 234, to reach the reflected-light quantity detecting circuit 235. The quad photo detector 234 detects the light quantities on four-divided portions on the detector 234 to generate servo signals for controlling the beam position on the disc medium 1 with respect to the designated track. In the embodiment of the present invention, the servo signals from the quad photo detector 234 are input to the reflected-light quantity detecting circuit 235 and are summed therein. Thus, the voltage (a) corresponding to the sum of the reflected light quantity is obtained at the output of the reflected-light quantity detecting circuit 235.

Since the reflected light quantity is too strong during a write operation for the RF detector 237, the output of the RF detector is saturated and thus the RF detector 237 can not effect a read operation of the reflected light beam during the write operation.

If the voltage (a) indicates that a write mark is already recorded on the designated sector, a subsequent data write operation is inhibited, as later described in detail. If the voltage (a) indicates that a write mark is not written on the designated sector, data is written successively within one rotation of the disc medium 1, after the write mark is written thereon.

In a read operation, the write amplifier 7 provides a electric signal to the laser diode 21, which converse the electric signal to a read laser beam having a relatively low power. The read laser beam is also irradiated on the disc medium 1. The reflected light beam passes through the objective lens 223, the polarization beam split prism 22, the half mirror 231, and the condenser lens 236, to reach the RF detector 237. The RF detector 237 converts the received light beam including read data having a maximum frequency of about 20 MHz into an electric signal. The read amplifier 8 amplifies the electric signal, and the wave form shaping circuit 81 generates a read data pulse signal based on the amplified signal. The clock extracting circuit 82 receives the pulse signal to generate a read clock signal. The synchronizing circuit also receives the pulse signal to generate a read data which is synchronous with the clock signal applied from the clock extracting circuit 82. Since the light beam generated from the write amplifier 7 has a relatively low power, the output voltage (a) from the reflected-light quantity detecting circuit 235 is too low to be compared with the reference voltage (b) (FIG. 3). Therefore, the output voltage (a) is not used during a read operation.

Figure 5:
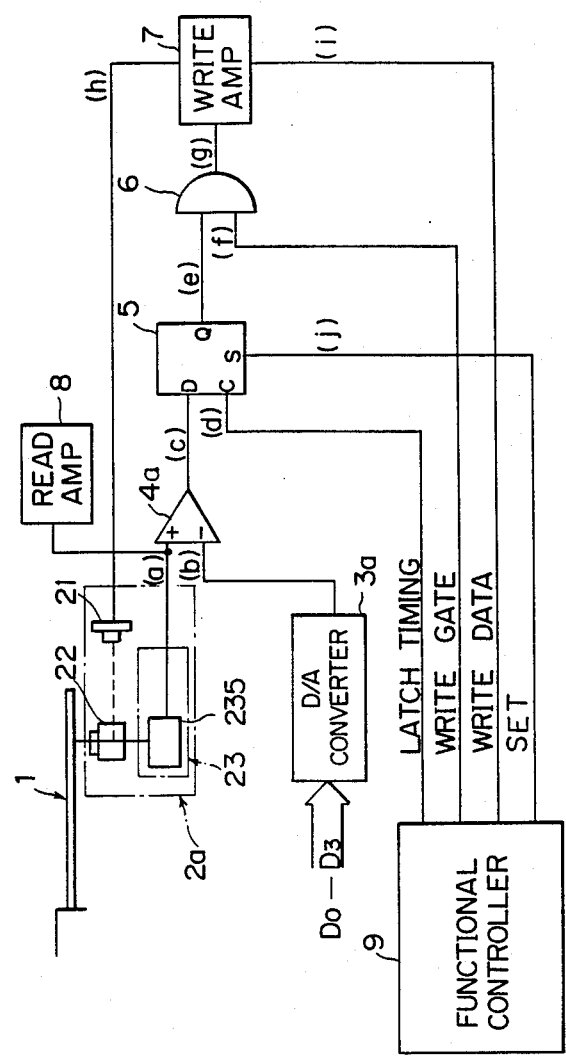
FIG. 5 is a block diagram of an optical writing add reading device according to the first embodiment of the present invention.

FIG. 5 is a block diagram of an optical writing and reading device according to the first embodiment of the present invention.

Figure 6:
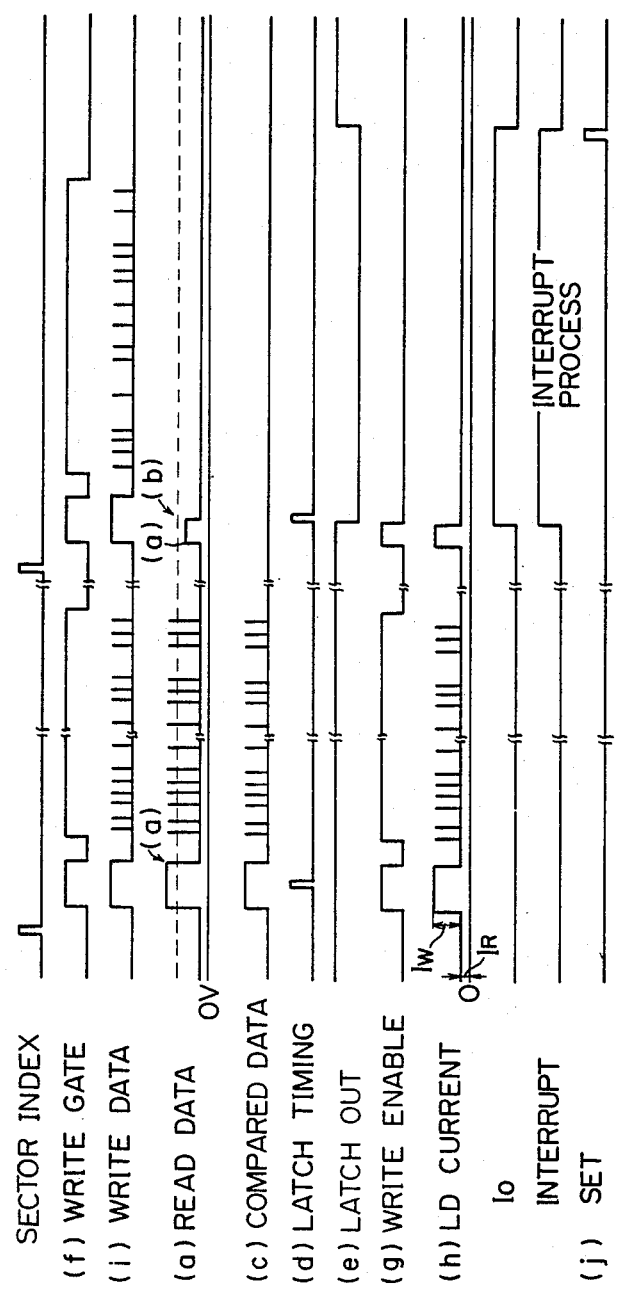
FIG. 6 is a waveform diagram explaining waveforms at various points in the device shown in FIG. 5.

FIG. 6 is a waveform diagram explaining waveforms at various points in the device shown in FIG. 5. The device of the first embodiment will be described with reference to FIGS. 5 and 6.

In this embodiment, by the disc medium 1, the reflected light quantity from an already recorded region is made lower than the reflected light quantity from an unrecorded region. To this end, for example, a hole forming type medium is used in which the incident light passes through the hole and is not reflected.

In the embodiment of FIG. 5, a digital/analog converter (hereinafter referred to as a D/A converter) 3a is used as the reference voltage generating circuit 3 of FIG. 3. The reference voltage (b) must be changed in order to compensate for changes in the reflected light quantity due to the changes of the write power from the laser diode 21 or changes in the reflectivity at the outer side and the inner side of the disc medium 1. Voltage control signals $D_0$–$D_3$ correspond to a reference voltage (b) to be compared with the detected voltage (a), which changes depending on whether or not a write mark is already written or depending on the change of the emitted light quantity irradiated at the inner or outer sides of the disc medium 1 during the writing of data The voltage control signals $D_0$–$D_3$ are transmitted from a not-shown portion inside the apparatus to the D/A converter 3a.

The D/A converter 3a carries out a D/A conversion of these voltage control signals $D_0$–$D_3$ and provides the reference voltage (b), which is proportional to the light quantity emitted from the laser diode 21, and which is transmitted to one input terminal ("−" terminal) of a comparing circuit 4a. The comparing circuit 4a compares the detected voltage (a) with the reference voltage (b) to output a compared output voltage (c) representing whether or not a write mark is already written.

The reflected light passes from the optical disc medium 1, through the polarization beam split prism 22, into the photo detecting portion 23. Note that, in FIG. 5, the photo detecting portion 23 is simply represented, for simplifying the drawing, by the reflected-light quantity detecting circuit 235, which includes current/voltage converting circuits as described later in detail.

The reflected light quantity is converted into the voltage (a) by the photo detecting portion 23, and is transmitted to the other input terminal ("+" terminal) of the comparing circuit 4a. The comparing circuit 4a compares the voltage (a) and the voltage (b), and transmits a compared output voltage (c) to a terminal D of the latching circuit (flip flop) 5.

Note that the latching circuit 5 is previously set by a set signal (j) before writing data, and latches the output voltage (c) of the comparing circuit 4a in accordance with the latch timing (d) which is input to terminal C of the latching circuit 5. The latch timing is generated during writing of the data.

Writing of the data is started in response to a write gate (f) and the output (e) of the latching circuit 5. When data is to be written, a control portion (not shown in FIG. 5) positions the optical head 2 so that a write mark is first written on the mar recording region provided immediately prior to the data recording region.

If the sector S(i) on which the data is to be written is blank, the voltage (a) during writing of the write mark is higher than the reference voltage (b). Therefore, the output voltage (c) of the comparator 4a is at a high level "H" at the latching timing (d) so that the output (e) of the latching circuit 5 becomes "1", with the result that the write gate signal (f), which is the same as the write mark, is transmitted, as a write enable signal (g), from the AND gate circuit 6 to the write amplifier 7.

In response to the write enable signal (g), the write amplifier 7 amplifies the write mark in the write data (i) to output an LD control signal (h) which is then applied to the LD21. Thus, the write mark is written in the write mark recording region, and the write data (i) is subsequently written in the same way in the data recording region.

If a write mark is already written on the sector S(i) on which the data is to be written, this means that data is already written on the sector S(i). In this case, the voltage (a) caused by the reflected light quantity from the write mark is lower than the reference voltage (b) because the mark is previously written, so that almost all of the incident light quantity passes through the pit of the write mark and thus the reflected light quantity becomes small.

Because of this, the output voltage (c) of the comparing circuit 4 at the latch timing (d) is "low" so that the output (e) of the latching circuit 5 becomes "0" after the latching timing (d), and thus the AND gate 6 forces the write amplifier 7 to be turned OFF to inhibit the write operation thereafter.

After the write gate (f) becomes "L" level, the set signal (j) is generated to again set the latching circuit 5 so that its output (e) becomes "H" level. Subsequent writing of data is started by the write gate (f) and the output of the latching circuit 5.

Figure 7:
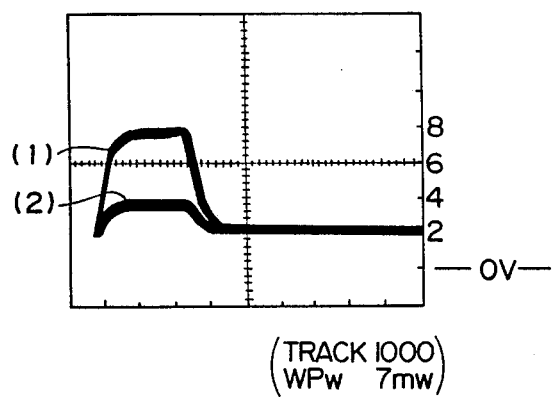
FIG. 7 is an experimental graph showing a voltage difference in reflected light voltages.

FIG. 7 shows an example of a voltage difference between a reflected light voltage (1) detected by the photo detecting portion 23 when a write mark is not yet written on a blank sector S(i) and a reflected light voltage (2) detected by the photo detecting portion 23 when a write mark is already written on an already recorded sector S(i). The track number in this example is 1,000 and the write power received at the disc medium is 7 mW. The reflected light voltage (1) of the blank region is about 8 V, and the reflected light voltage (2) of the already recorded region is lowered to about 3.5 V.

Figure 8:
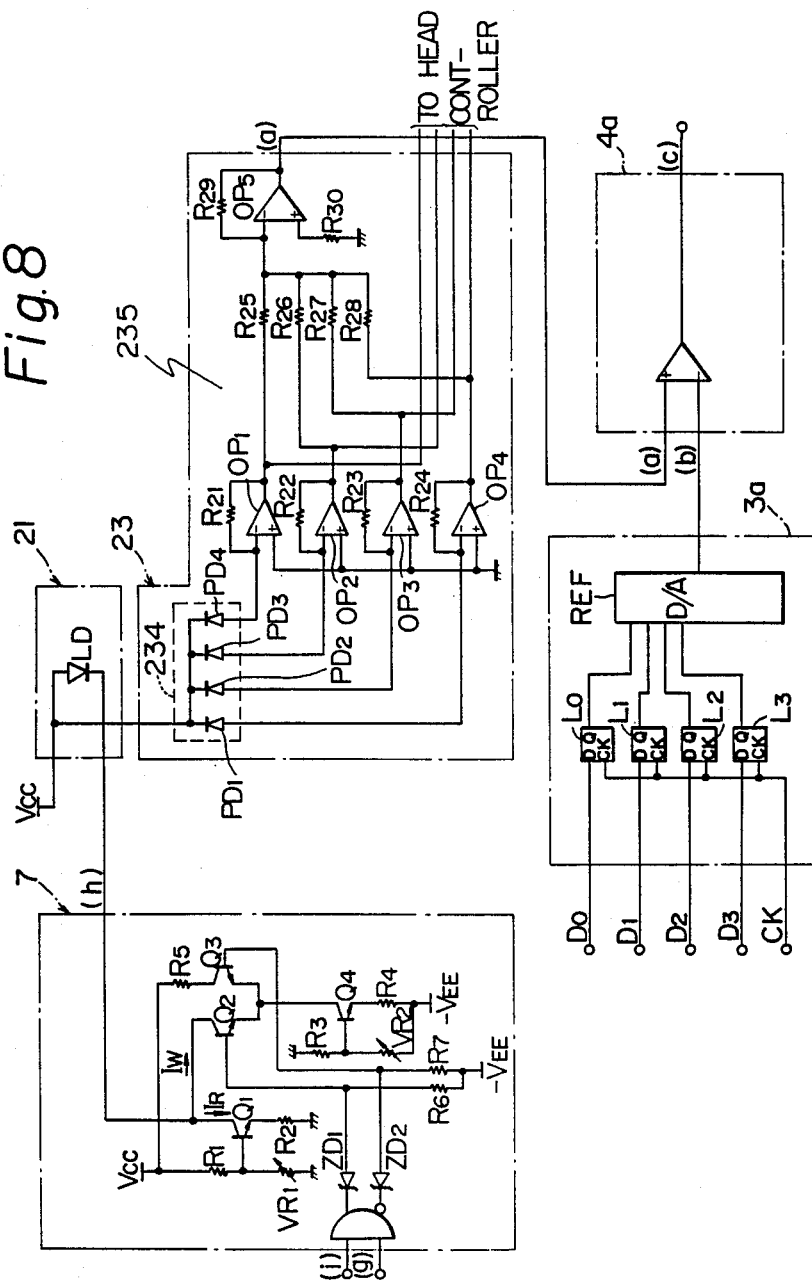
FIG. 8 is a detailed circuit diagram of the construction of the various units in the device shown in FIG. 5.

FIG. 8 is a detailed circuit diagram of the construction of the various units in the device of the first embodiment shown in FIG. 5. In FIG. 8, the D/A converter 3a, the comparing circuit 4a, the write amplifier 7, the laser diode 21, and the photo detecting portion 23 are illustrated in detail. The write amplifier 7 includes a reading current conducting circuit consisting of a transistor $Q_1$, a voltage dividing resistor $R_1$ and a bias resistor $R_2$, and a variable resistor $VR_1$ for adjusting the base voltage; a current switch consisting of emitter coupled transistors $Q_2$ and $Q_3$, a load resistor $R_5$ and bias resistor $R_6$ and $R_7$; a constant-current source consisting of a transistor $Q_4$, a voltage dividing resistor $R_3$, a bias resistor $R_4$ and a variable resistor $VR_2$; zener diodes $ZD_1$ and $ZD_2$ having their anodes connected to the bases of the emitter coupled transistors $Q_2$ and $Q_3$, respectively; and a gate circuit $G_1$.

The collection of the transistors $Q_1$ and $Q_2$ are connected to the cathode of the laser diode (LD) 21. The anode of the laser diode 21 is connected to the power supply $V_{CC}$.

During a read operation, the transistor $Q_1$ conducts a certain small current $I_R$ through the LD 21.

During a write operation, when the write data (i) is at a low level "L" and when the write enable signal (g) is at a low level "L", then the transistor $Q_2$ is cut OFF and the transistor $Q_3$ is ON, so that a write current Iw is not conducted through the LD21. When the write data (i) is at a high level "H" but the write enable signal (g) is at a low level "L", the transistor $Q_2$ is not turned ON but the transistor $Q_3$ is turned ON. This can be effected by appropriately determining the resistances of the resistors $R_6$ and $R_7$. Only when the write enable signal (g) is at a high level "H", does the transistor $Q_2$ conduct the write current Iw through the LD 21 when the write data (i) is at a high level "H".

The photo detecting portion 23 in FIG. 8 includes the quad photo detector 234 consisting of four pin photo diodes $PD_1$, $PD_2$, $PD_3$, and $PD_4$, respectively, provided for detecting the light quantities on the four decided portions. The currents detected by the photo diodes $PD_1$-$PD_4$ are converted to voltages, respectively, by operational amplifiers $OP_1$-$OP_4$, and resistors $R_{21}$, $R_{22}$, $R_{23}$, and $R_{24}$ connected in parallel to the operational amplifiers $OP_1$-$OP_4$. The voltages output from the operational amplifiers $OP_1$-$OP_4$ are summed by a wired OR through resistors $R_{25}$-$R_{28}$. The sum of the voltages is amplified by an amplifier consisting of an operational amplifier $OP_5$ and resistors $R_{29}$ and $R_{30}$. As a result, the voltage (a) to be compared with the reference voltage (b) is obtained at the output of the operational amplifier $OP_5$.

The D/A converter 3a in FIG. 8 includes latching circuits $L_0$-$L_3$ for respectively latching the voltage $R_{30}$ control signals $D_0$-$D_3$ in response to a clock signal CK, and a reference voltage generating circuit REF for providing the reference voltage (b) corresponding to the voltage control signals $D_0$-$D_3$.

The voltage (a) is applied to the noninverted input of a comparator 4a and the reference voltage (b) is applied to the inverted input of the comparator 4a. Thus, the compared output voltage (c) is obtained at the output of the comparing circuit 4a.

As can be seen from FIG. 6, in the first embodiment, if the voltage (a) is lower than the reference voltage (b), the compared output voltage (c) is at a low level "L".

In FIG. 8, the base voltages of the transistors Q, and $Q_4$ are determined by the variable resistors $VR_1$ and $VR_2$, respectively. In practice, however, these voltages are determined to be proportional to the reference voltage (b) at the output of the D/A converter. Accordingly, the write current $I_w$ or the read current $I_R$ flowing through the write amplifier 7 is appropriately determined to correspond to the outer side or inner side of the disc medium.

Figure 9:
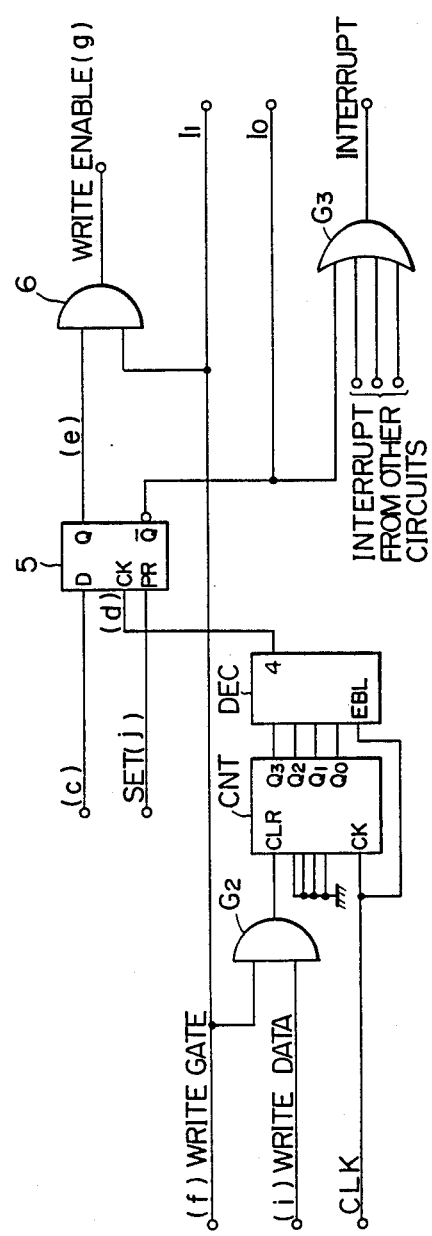

FIG. 9 is a circuit diagram of the latching circuit 5, the AND gate 6, and their peripheral circuits. FIG. 10 is a waveform diagram explaining the operation of the circuit shown in FIG. 9. Referring to FIGS. 9 and 10, the write gate signal (f) and the write data (i) including the write mark are applied to the inputs of an AND gate $G_2$. A counter CNT of, for example, 4 bits, counts up the duration of the high level at the output of the AND gate $G_2$ in response to the clock signal CLK applied to a clock terminal CK. A decoder DEC decodes the outputs $Q_0$-$Q_3$ of the counter CNT to generate the latch timing signal (d). The latch timing signal (d) is generated at a middle point of the write mark duration. For example, in FIG. 10, the signal (d) is generated after the count value exceeds four. After the write mark duration, the counter CNT is cleared. In response to the latch timing signal (d), the latching circuit 5 latches the compared output signal (c) applied to the D input of the latching circuit 5. The latching circuit 5 has a preset terminal PR to which a set signal SET is previously applied before the latching operation. The write gate signal (f) is gated by the latch out signal (e) through the AND gate 6 so that the write enable signal (g) is obtained.

The write gate signal (f) is output as an input signal $I_1$, of the functional controller 9. The inverted output $\overline{Q}$ of the latching circuit is also output as an input signal $I_0$ of the functional controller 9. The signal $I_0$ is also used through an OR gate $G_3$ to be an interrupt signal applied to a microprocessor in the functional controller 9. The OR gate $G_3$ also receives interrupt signals from other circuits.

Figure 11A:
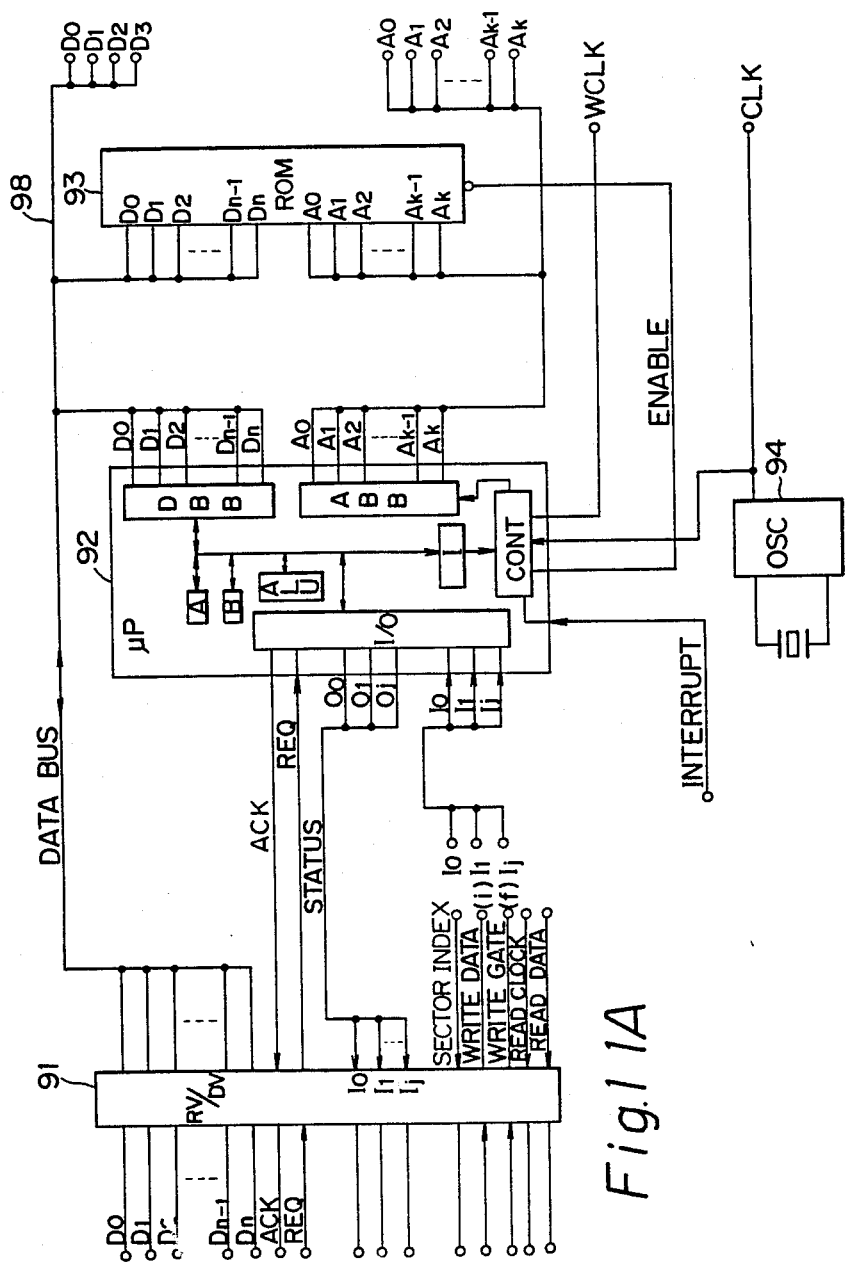
FIGS. 11A and 11B are block diagrams of the functional controller 9 in the device shown in FIG. 5.
Figure 11B:
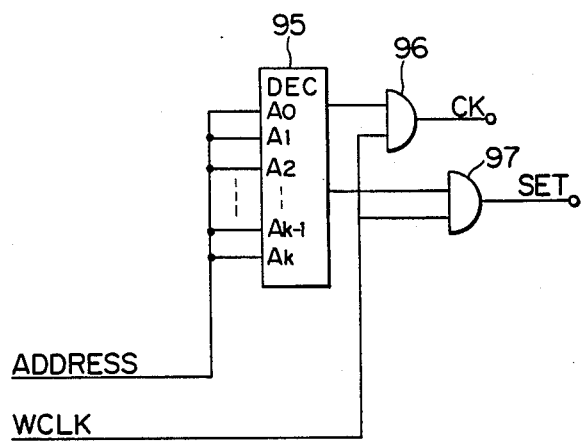

FIGS. 11A and 11B are detailed block diagrams of the functional controller 9. The functional controller 9 includes a receiver/driver interface 91, a microprocessor 92, a read only memory 93, an oscillator 94, an address decoder 95, and NND gates 96 and 97.

The receiver/driver interface 91 is connected between the microprocessor 92 and a high level controller (not shown) so that data $D_0$, $D_1$, ..., and $D_n$, including a track number at which the optical head 2 will seek, write data, a write mark, control data, and an instruction, are transmitted and received between the high level controller and the microprocessor 92 through the receiver/driver interface 91. Also, a request signal REQ and an acknowledge signal ACK are transmitted and received between the high level controller and the microprocessor 92 through the receiver/driver interface 91. Further, other control signals, such as status signals, sector index signal, write data signal (i), the write gate (f), a read clock signal, the read data, are transmitted and received between the high level controller and the microprocessor 92.

The microprocessor 92 includes, for example, a data bus buffer DBB, an address bus buffer ABB, an A register, a B register, an arithmetic and logic unit ALU, an instruction register I, an input/output interface, and a control circuit CONT. The microprocessor 92 is well known in the art, for example, the 8031 sold by Intel Corporation.

The ROM 93 stores programs, tables of data for the search operation of the optical head 2, and addresses.

The oscillator 94 generates a clock signal CLK which is applied to the control circuit CONT in the microprocessor 92 and to the counter CNT shown in FIG. 9.

The decoder 95 in FIG. 11B decodes the address signals $A_0$-$A_k$ to determine whether or not the D/A converter is to be accessed.

Figure 12:
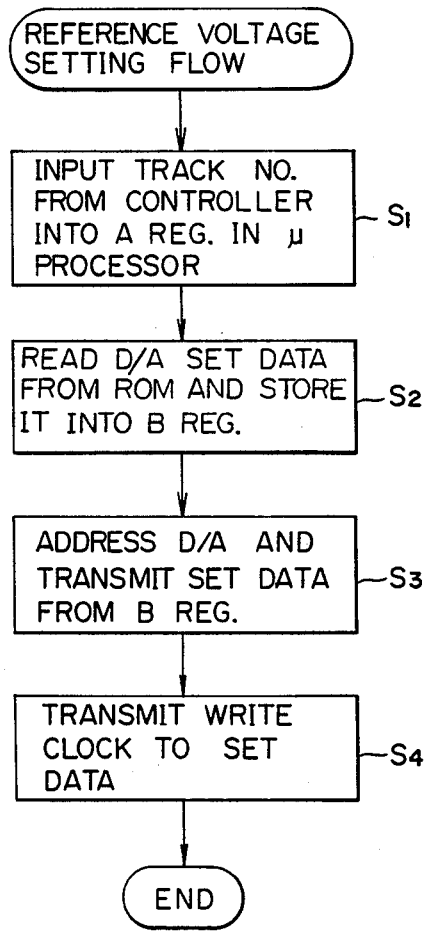
FIG. 12 is a flow chart explaining the reference voltage setting operation in the functional controller shown in FIGS. 11A and 11B.

The operation of the functional controller 9 shown in FIGS. 11A and 11B is described with reference to the flow charts shown FIGS. 12 and 13.

The operation of setting the reference voltage (b) is described with reference to FIG. 12. In FIG. 12, at step $S_1$, a track number is transferred from the high level controller (not shown) through the receiver/driver interface 91 to the microprocessor 92 and is stored through the data bus buffer DBB into the A resistor. At step $S_2$, a D/A set data is read from the ROM 93 and is stored through the data bus buffer DBB into the B register. The D/A set data is used to set the reference voltage (b). The D/A set data corresponds to the track number to be sought, since the outer track of the disc medium requires a larger light quantity than the inner track At step $S_3$, the control circuit CONT designates the address allocated to the D/A converter 3a (FIG. 8). Also, under the control of the control circuit CONT, the D/A set data stored in the B register is read, through the data bus buffer DBB and the data bus 98, into the D/A converter 3a shown in FIG. 8. At step $S_4$, the control circuit CONT generates the write clock signal WCLK which is gated through the AND gate 96 to be output as the latching clock signal CK. In response to the latching clock signal CK, the latching circuits $L_0$-$L_3$ in the D/A converter 3a latch the D/A set data $D_0$-$D_3$ (FIG. 8).

Figure 13:
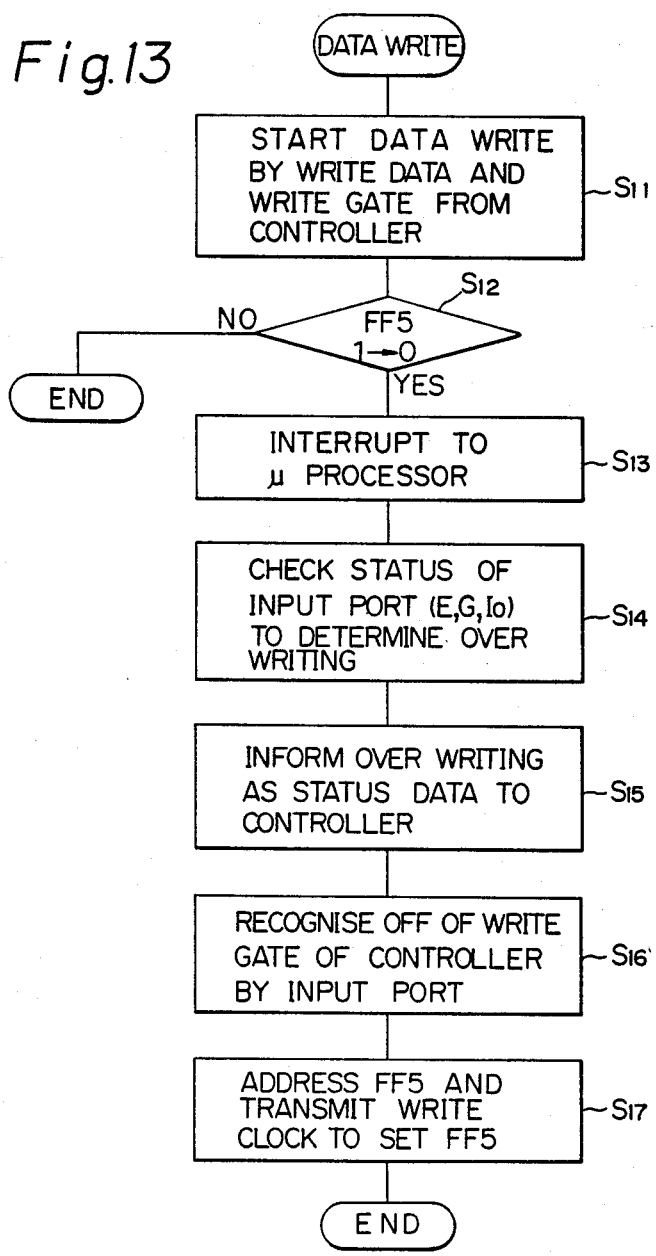
FIG. 13 is a flow chart explaining a data writing operation in the functional controller shown in FIGS. 11A and 11B.

FIG. 13 is a flow chart explaining a data writing operation. In FIG. 13, at step $S_{11}$, the data write operation starts after a search operation by the optical head 2 is completed and when the write data (i) and the write gate signal (f) are received from the high level controller (not shown). At step $S_{12}$, if the latch-out signal (e) changes from "1" to "0", then at step $S_{13}$, the interrupt signal is applied from the latching circuit 5 through the OR gate $G_3$ (FIG. 9) to the control circuit CONT in the microprocessor 92. Thus, an interruption routine is started. In the interruption routine, at step $S_{14}$, the microprocessor checks the status of the input port I/O to determine whether the data write operation will be an over-writing operation. This determination can be effected by supervising the status of, for example, the input signal I generated from the $\overline{Q}$ output of the latching circuit 5. Then, at step $S_{15}$, the microprocessor 92 informs the high level controller that the signal $I_0$ is "1". This is done by sending a status data from, for example, an output terminal $O_0$ of the I/O port of the microprocessor 9 through the receiver/driver to the high level controller. Then, at step $S_{16}$, the microprocessor 9 recognizes that the write gate signal (f) applied as an input signal $I_1$ to the I/O port of the microprocessor 9 is turned OFF. Finally, at step $S_{17}$, after the recognition that the write gate signal (f) is turned OFF, the control circuit CONT in the microprocessor 92 controls the address bus buffer ABB so as to output an address allocated to the latching circuit 5. The decoder 95 decodes this address and generates a set signal (j). Simultaneously, the control circuit CONT in the microprocessor 9 generates the write clock signal WCLK. The AND gate 97 (FIG. 11B) passes the set signal (j) in response to the write clock signal WCLK. The set signal (j) is applied to the preset terminal PR of the latching circuit 5 to reset same.

Modification of the First Embodiment

In the aforementioned first embodiment, the light quantity reflected from a write mark is smaller than the light quantity reflected from a portion where a write mark is not written. However, the reverse is also possible. That is, in the modification of the first embodiment, a pit reflects a larger light quantity than a portion where a pit is not formed. The optical disc unit of such a type, i.e., employing a it reflecting a larger light quantity, is known as, for example, a phase change type. In the phase change type optical disc unit, the disc medium is, as an example, in a amorphous state before irradiation of a laser beam and is changed to an crystal state after the irradiation of the laser beam.

Figure 14:
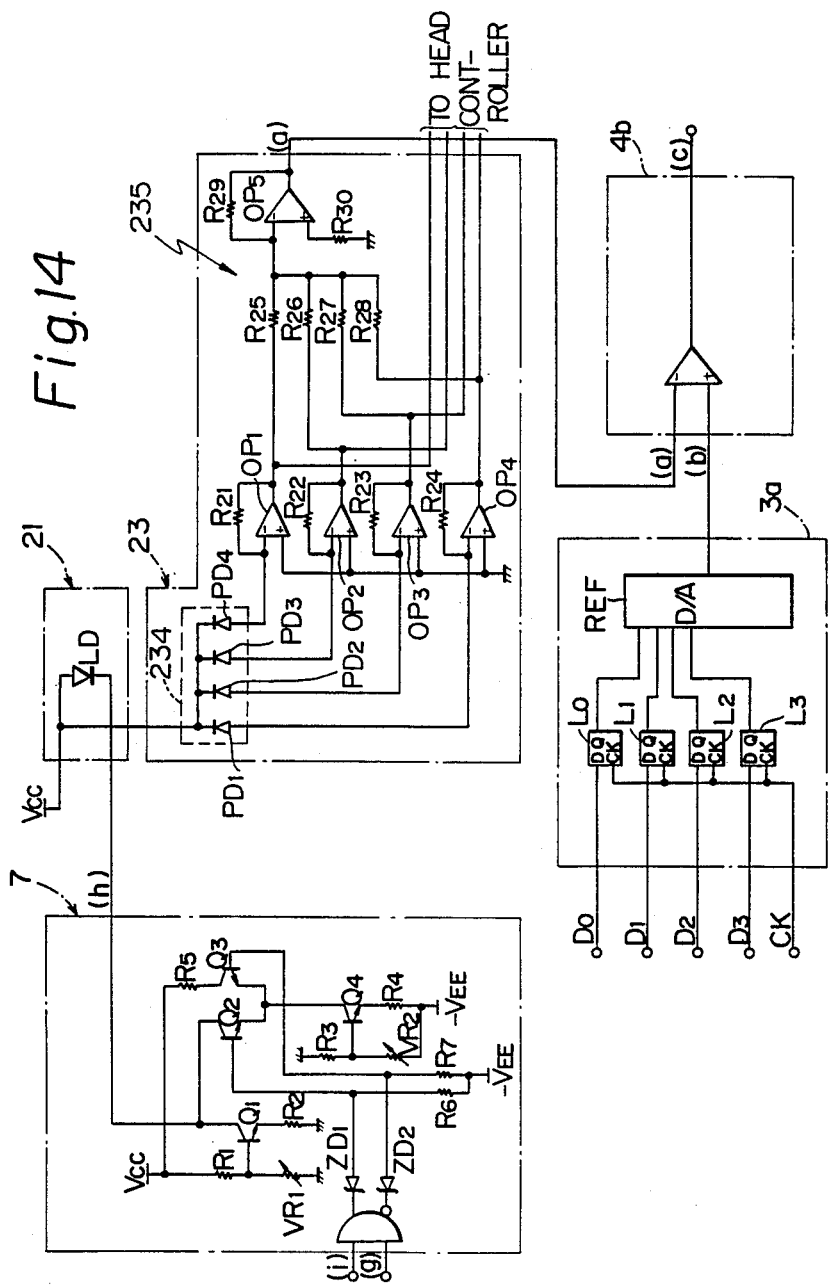
FIG. 14 is a circuit diagram of a modification of FIG. 8.

FIG. 14 is a circuit diagram of a modification of the circuit shown in FIG. 8. The only difference between FIGS. 8 and 14 resides in the comparing circuit 4b in FIG. 14. That is, the detected voltage (a) is input to the inverted input terminal of the comparing circuit 4b; and the reference voltage (b) is input to the noninverted input terminal of the comparing circuit 4b.

Figure 15:
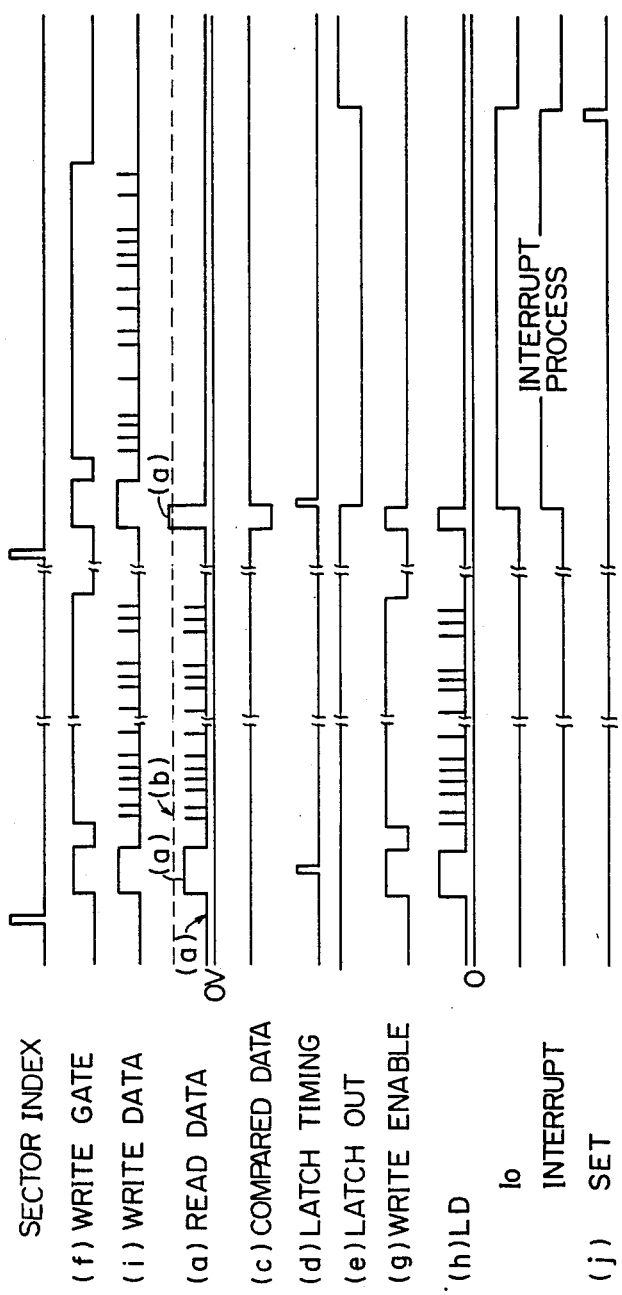
FIG. 15 is a waveform diagram explaining the operation of the circuits shown in FIG. 14.

FIG. 15 is a waveform diagram explaining the operation of the modification of the first embodiment. The difference between FIG. 6 and FIG. 15 is that, in FIG. 14, the reference voltage (b) is set at a higher level than that in FIG. 6. The detected voltage (a) is lower than the reference voltage (b) when a write mark or data are already written, and the detected voltage (a) exceeds the reference voltage (b) when a write mark is not written. The compared output (c) becomes low level when the detected voltage (a) exceeds the reference voltage (b). The other waveforms in FIG. 15 are the same as those in FIG. 6.

Second Embodiment

Figure 16:
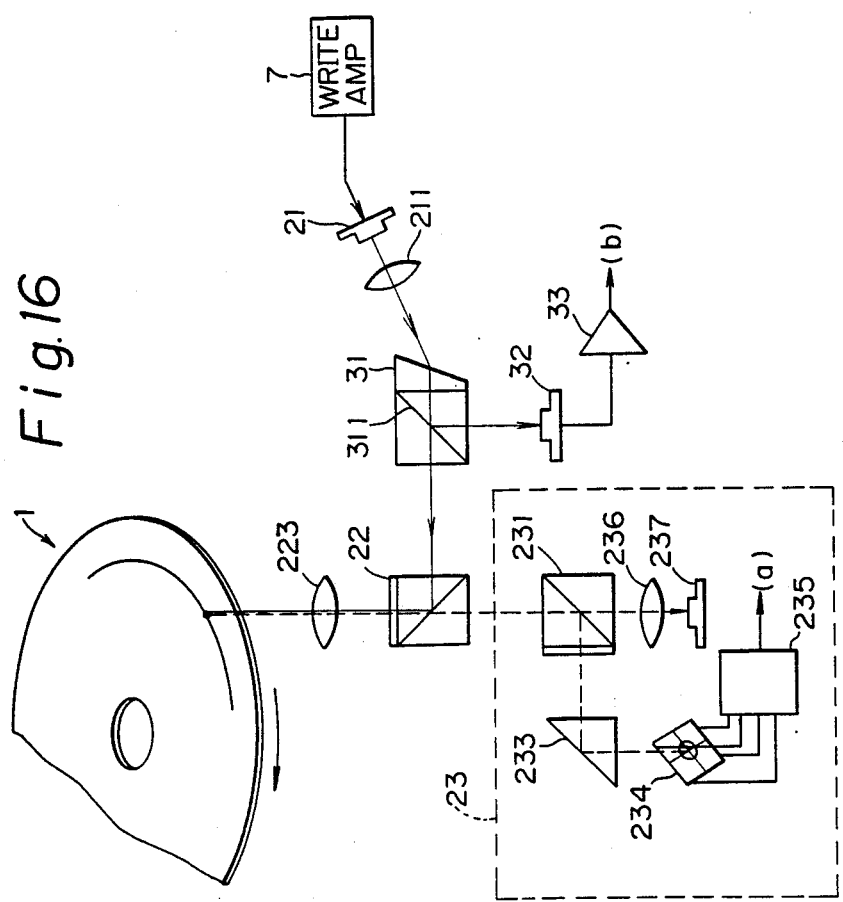
FIG. 16 is a system diagram of an optical writing and reading apparatus, according to a second embodiment of the present invention.

FIG. 16 is a system diagram of an optical writing and reading apparatus, according to a second embodiment of the present invention.

In FIG. 16, the same parts as those in FIG. 4 are represented by the same reference symbols or numerals. According to the second embodiment of the present invention, in place of the D/A converter 3a shown in FIG. 5, the reference voltage (b) is obtained directly from the incident laser beam. To this end, a prism 31 including a half mirror 311 is provided on the light path between the collimate lens 211 and the polarization beam split prism 22. Half of the light beam from the collimator lens 211 is reflected by the half mirror 311. The reflected light beam is then converted to an electric current by the photo detector 32. The electric current is converted to a voltage and the voltage is amplified by an amplifier 33. Thus, the reference voltage (b) is obtained.

Figure 17:
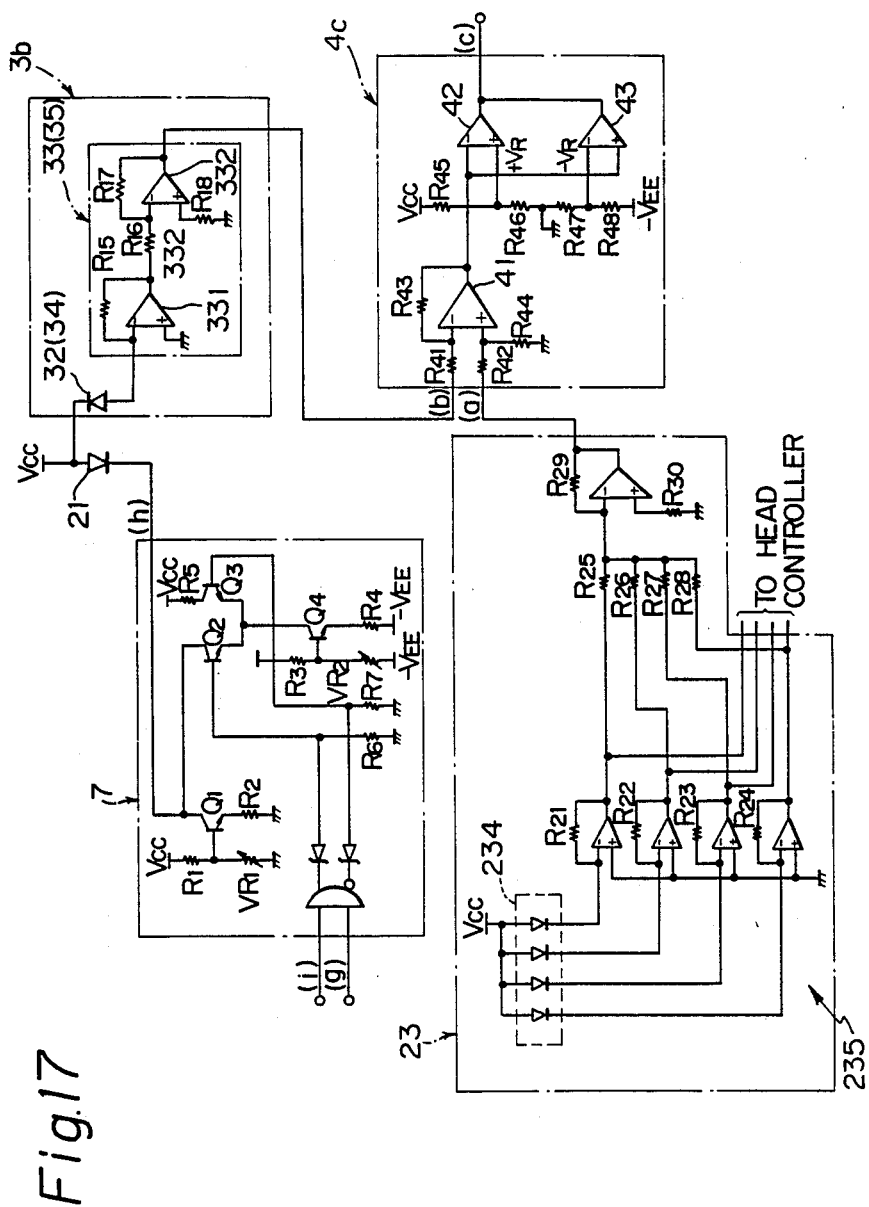
FIG. 17 is a circuit diagram of a detailed construction of the device of the second and third embodiments of the present invention.

FIG. 17 is a circuit diagram of a detailed construction of the various units in the device of the second embodiment shown in FIG. 16. In FIG. 17, the write amplifier 7 and the photo detecting portion 23 are the same as those in FIG. 8, but the reference voltage generating circuit 3b and the comparing circuit 4c are different from the D/A converter 3a and the comparing circuit 4a in FIG. 8. The reference voltage generating circuit 3b includes the photo detector 32 and the amplifier 33. The photo detector 32 is a pin photo diode for converting light into an electric current. The amplifier 33 includes a current-voltage converting circuit 331 and a voltage-adjusting circuit 332. The reference voltage (b) is determined by the ratio of resistors $R_{16}$ and $R_{17}$. In this second embodiment, the reference voltage (b) is determined to be nearly equal to the detected voltage (a) when a write mark or write data is already written. The comparing circuit 4b includes a differential amplifier 41 and two comparators 42 and 43. The differential amplifier 41 calculates the voltage difference (a)−(b), and the voltage difference (a)−(b) is compared with a positive threshold voltage $+V_R$ by the comparator 42. The voltage difference (a)−(b) is also compared with a negative threshold voltage $-V_R$ by the comparator 43.

The output of the comparators 42 and 43 are wired ORed. Thus, the compared output (c) is obtained.

Figure 18:
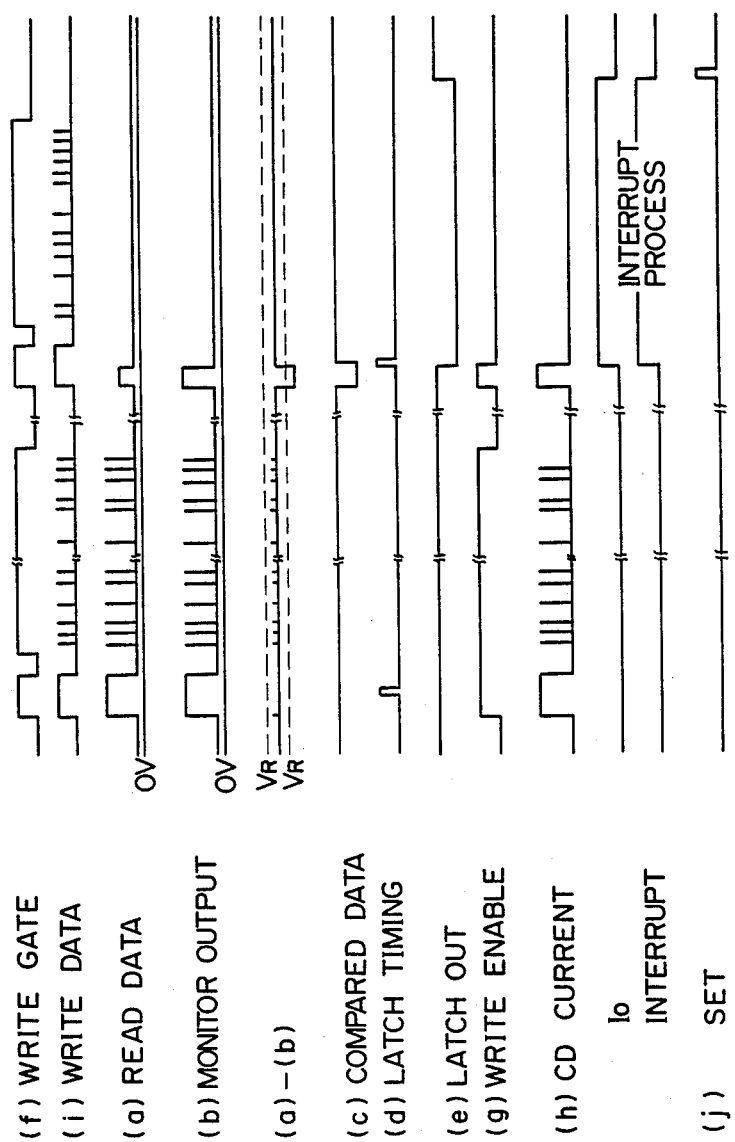
FIG. 18 waveform diagram explaining the of the develop shown in FIG. 17.

FIG. 18 is a waveform diagram explaining the operation of the device shown in FIGS. 16 and 17, according to the second embodiment of the present invention. As will be seen from FIG. 18, a voltage difference between the detected voltage (a) and the monitor output voltage (b) is calculated. If a write mark or write data is not yet written, the monitor output voltage (b) is nearly equal to the detected voltage (a). In FIG. 18, small noise signals (a)−(b), which are within the range between $+V_R$ and $-V_R$, are illustrated. By contrast, if a write mark is already written, the detected voltage (a) is decreased so that the difference (a)−(b) becomes a negative voltage below the negative threshold voltage $-V_R$. The other waveforms are exactly the same as those in FIG. 15 of the modification of the first embodiment.

The same circuit as shown in FIG. 17 of the second embodiment is also applicable to a modification of the second embodiment in which the reflected light quantity is increased when a write mark or write data is already written.

Figure 19:
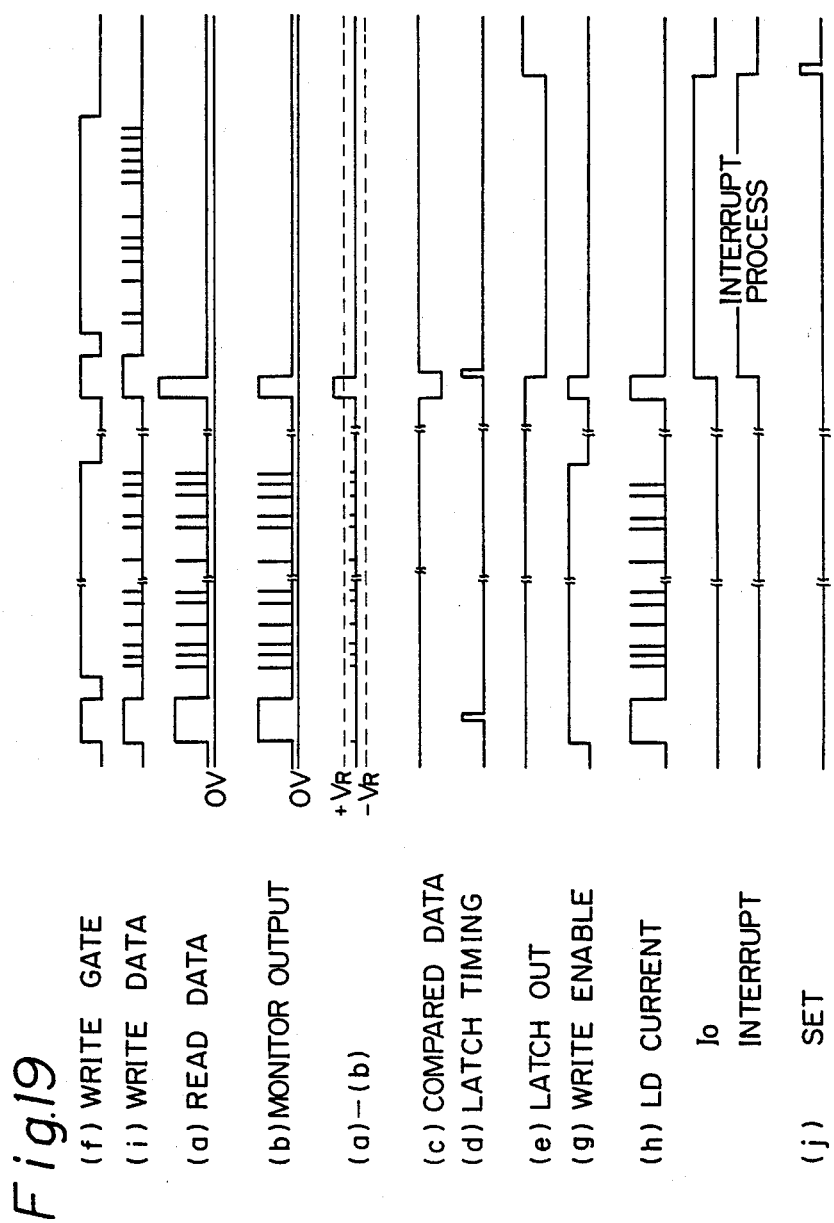
FIG. 19 is a waveform diagram explaining the operation of a modification of the device shown in FIG. 17.

FIG. 19 is a waveform diagram explaining the modification of the second embodiment. The only difference between FIGS. 18 and 19 is that, in FIG. 19, the read data or the detected voltage (a) is increased when a write mark is already written. Therefore, the voltage difference (a)−(b) exceeds the positive threshold voltage $+V_R$ so that the comparator 42 outputs a negative pulse (c). The other portions in FIG. 19 are exactly the same as those in FIG. 18. Therefore, the description of the other portions in FIG. 19 is omitted.

Third Embodiment

Figure 20:
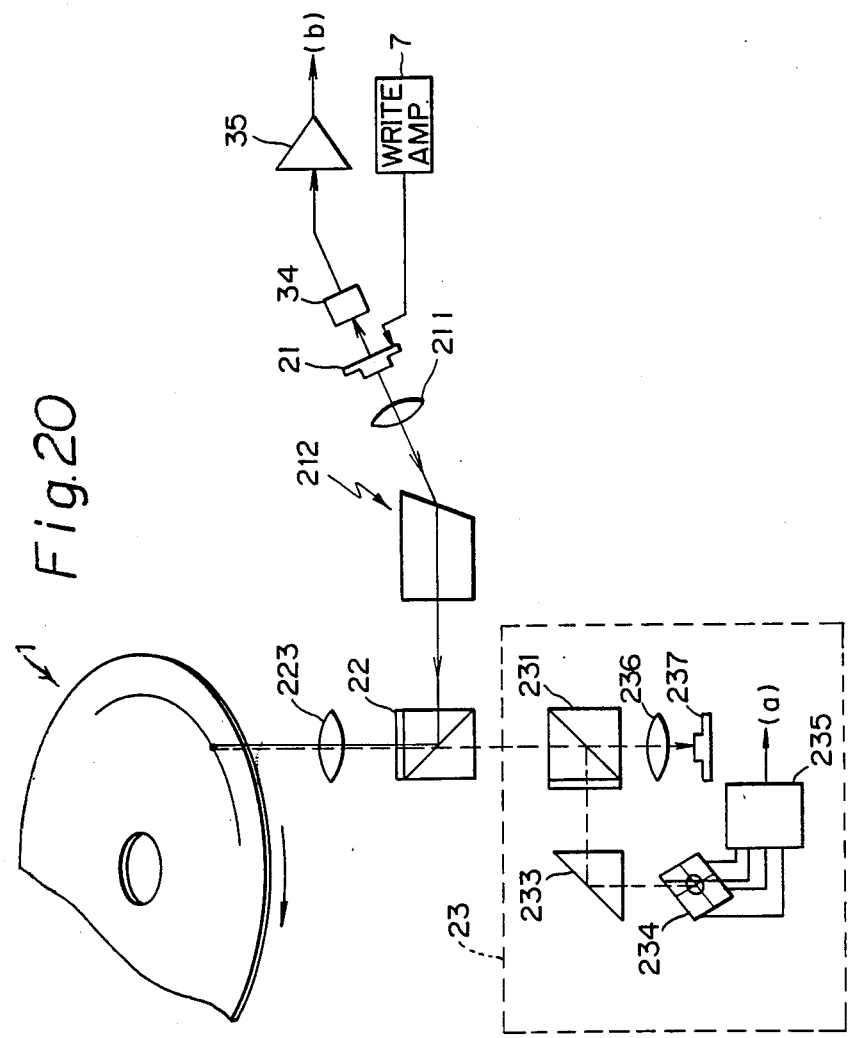
FIG. 20 is a system diagram of an optical writing and reading apparatus according to a third embodiment of the present invention.

FIG. 20 is a system diagram of an optical writing and reading apparatus according to a third embodiment of the present invention. The difference between the second embodiment shown in FIG. 16 and the third embodiment shown in FIG. 20 is that, in FIG. 20, a monitoring unit 34 for monitoring the output of the laser diode is connected to the back surface of the laser diode 21. Such a monitoring unit per se, utilizing the output from the back surface of the laser diode, is well known in the art. The monitored laser beam quantity is converted into the reference voltage (b) by an amplifier 35. The monitoring unit 34 is realized by the pin photo diode 32 shown in FIG. 17. The amplifier 35 is realized by the amplifier 33 shown in FIG. 17. The circuit for generating the compared voltage (c) in the third embodiment is, therefore, the same as the circuit shown in FIG. 17 for the second embodiment. In this third embodiment also, modifications are possible in which the detected voltage (a) is increased or decreased depending on the type of pit formed on the disc medium. The waveform diagrams for the third embodiment and the modification thereof are the same as shown in FIGS. 18 and 19, respectively.

In all of the foregoing first, second, and third embodiments, only one light beam is irradiated on the disc medium 1 during writing or reading. In such a one light-beam system, a verification of whether or not correct data has been written must be effected at each one rotation of the disc medium after writing data. Therefore, even when a write mark and write data are written during one rotation, the additional one rotation for the verification is necessary. Therefore, in the one light-beam system, the advantage of the present invention is no clearly revealed.

Figure 21:
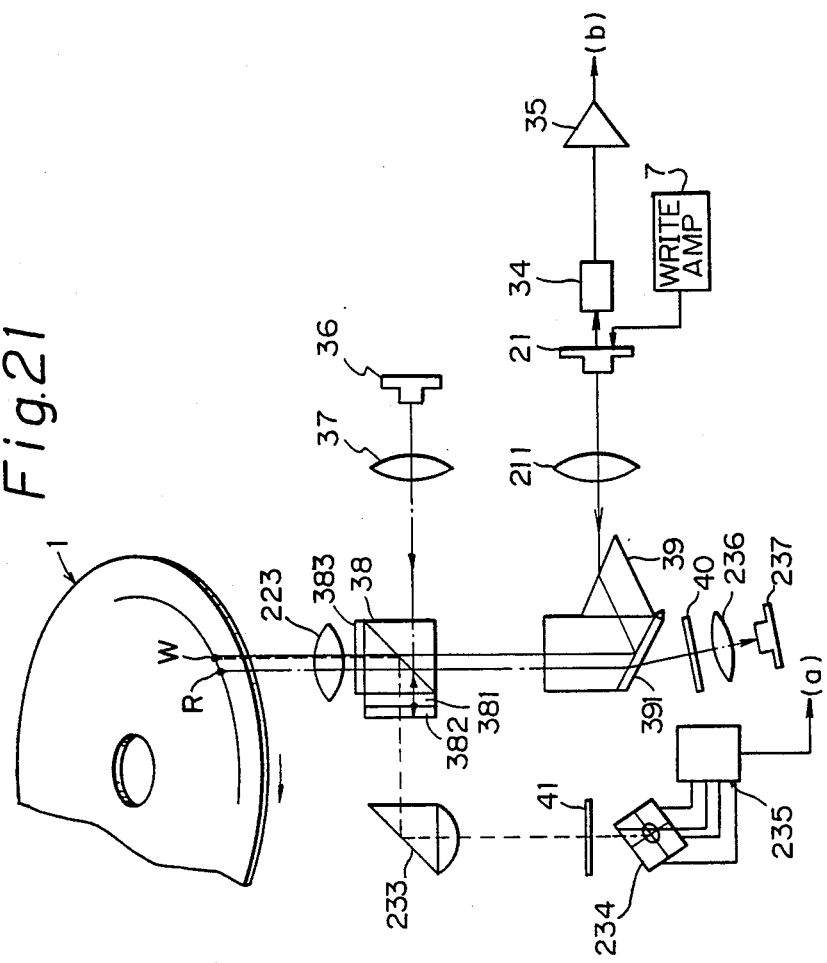
FIG. 21 is a system diagram of an optical writing and reading apparatus according to a fourth embodiment of the present invention.

FIG. 21 is a system diagram illustrating an optical writing and reading apparatus, according to a fourth embodiment of the present invention. The system shown in FIG. 21 is a two-beam system, including a write laser diode 21 and a read laser diode 36. The write laser diode 21 is used to obtain the reference voltage as well as to write data. The read laser diode 36 is used to verify the written data as well as to read data. During recording, the write laser diode 21 and the read laser diode 36 respectively emit a write laser beam of a longer wavelength and a read laser beam of a shorter wavelength. The write laser beam passes from the write laser diode 21, through the collimate lens 211, a prism 39, a polarization beam split prism 38, and the objective lens 223, to the surface of the disc medium 1 to form a write spot W having diameter of, for example, 1 μm. The read laser beam passes from the read laser diode 36 through a collimate lens 37, a polarization beam split prism 38, and a quarter wave plate 381 to reach a dichroic mirror 382. The read laser beam is then reflected by the dichroic mirror 382 and reflected by the polarization beam split prim 38. Then, the read laser beam passes through the objective 223 to reach the surface of the disc medium 1 to form a read spot R having a diameter of, for example, 1 μm. The write spot W and the read spot R are separated by, for example, 10 μm. By the two-beam system, verification can be effected immediately after a write operation without waiting for one rotation of the disc medium after the write operation. Therefore, by applying the first, second, and third embodiments to this two-beam system shown in FIG. 21, the recording of a write mark, the discrimination of whether or not data is already written, and the verification of the written data are carried out within one rotation of the disc medium 1.

The detected voltage (a) and the reference voltage (b) in FIG. 21 can be obtained in the same way as in the third embodiment shown in FIG. 20. The dichroic mirror 382 and a filter 41 transmit the reflected write beam having the longer wavelength. The dichroic mirror 391 and a filter 40 transmits the reflected read beam having the shorter wavelength. Note that the reference voltage (b) in the two beam system may be obtained by employing the D/A converter 3a shown in FIG. 8, or in the same way as described in the second embodiment shown in FIG. 16.

Fifth Embodiment

Figure 22:
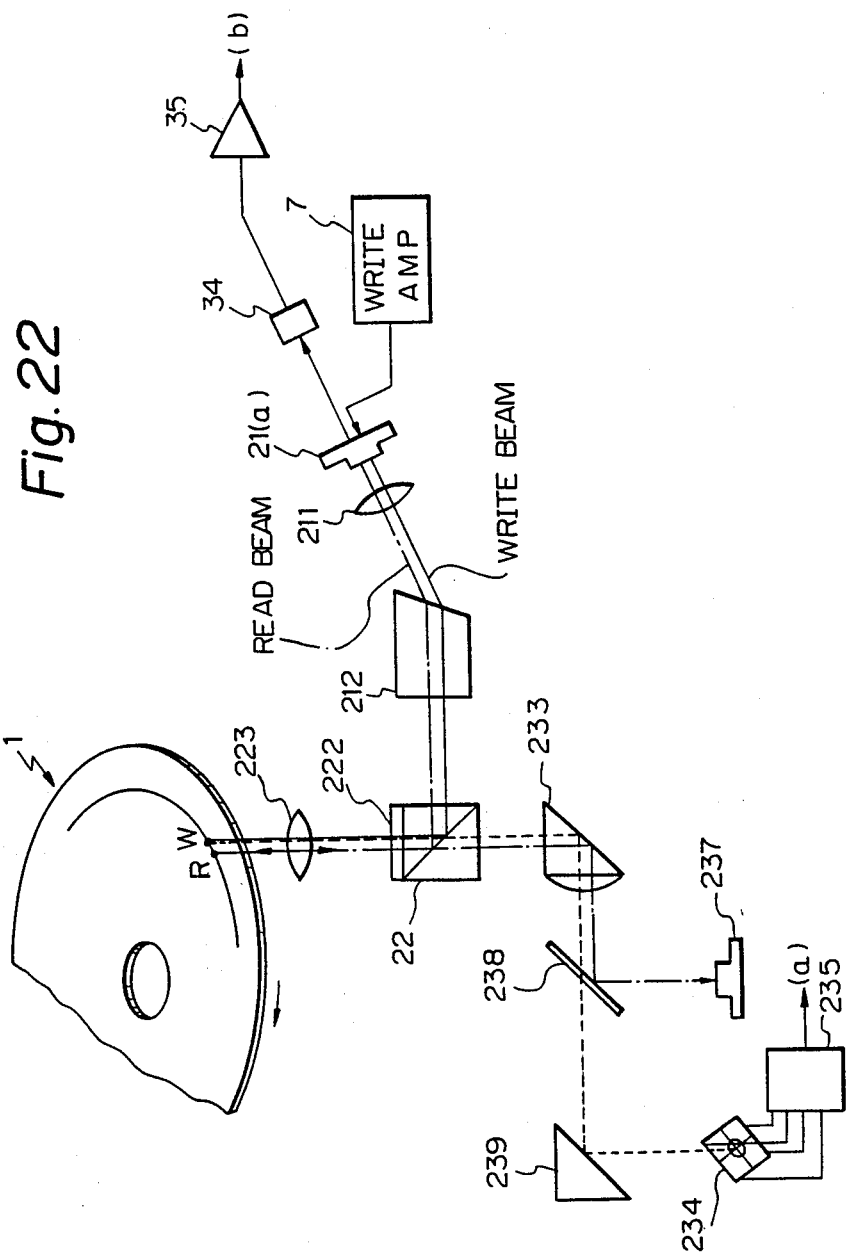
FIG. 22 is a system diagram of an optical writing and reading apparatus according to a fifth embodiment of the present invention.

In the above described fourth embodiment two laser diodes 21 and 36 are employed for effecting the write operation and verification within one rotation of the disc medium 1. By contrast, in the fifth embodiment shown in FIG. 22, a spatially-separating two-beam optical head is employed. In FIG. 22, a single laser diode 21 (a) simultaneously emits two beams having the same frequency. One of the two beams is a high power write laser beam for writing data. The other of the two beams is a low power read laser beam for reading data and for verification.

The simultaneously emitted two beams pass through the collimate lens 211, the prism 212, the polarization beam split prism 22, the quarter wave plate 222, and the objective lens 223, to form the write spot W and the read sport R similar to those shown in FIG. 21.

The reflected beams from the disc medium 1 pas through the objective lens 223, the quarter wave plate 222, the polarization beam split prism 22, and the prism 233 to reach a spatial filter 238. The spatial filter 238 spatially separates the reflected write beam and the reflected read beam. That is, the reflected write beam passes through a pin hole of the spatial filter 238 and a reflecting plate 239 to reach the quad photo detector 234; and the reflected read beam is reflected by a mirror of the spatial filter 238 to reach the RF detector 237. Thus, during writing operation, verification is carried out by the RF detector 237.

In this fifth embodiment also, the reference voltage (b) may be obtained by employing the D/A converter 3a shown in FIG. 8, or in the same way as described in the second embodiment shown in FIG. 16.

From the foregoing description, it will be apparent that, by carrying out the above-described one of the five embodiments, a write mark can be written immediately before a write data is written. Therefore, in an optical writing and reading apparatus of a rotary disc type, write data and a write mark can be recorded within one rotation of the disc so that the throughput of the apparatus is improved.

What is claimed is:

1. An optical writing and reading method for writing a mark and data on a recording medium having a plurality of recording sections, each said recording section having a mark recording region and a subsequent data recording region, said mark indicating that said data is already written on said data recording region, said method comprising the steps of:
   irradiating light at a write power level to write a mark on one of said mark recording regions regardless of whether a mark is already written on said one of said mark recording regions, said write power level being higher than a read power level;
   discriminating, during said irradiating step, whether or not a mark is already written on said one of said mark recording regions, by comparing the light quantity of the light irradiated during said irradiating step and reflected from said one of said mark recording regions with a reference value;
   inhibiting the subsequent writing of data on one of said data recording regions of said first recording section when a discrimination is made that a mark is already written on said one of said mark recording regions; and
   irradiating the light at the write power level so as to write data on said one of said data recording regions when a discrimination is made that a mark is not already written on said one of said mark record regions.

2. An optical writing and reading method as claimed in claim 1, wherein said mark is written by continuously irradiating light on said mark recording region for a period longer than any period of irradiation for writing data.

3. An optical writing and reading method as claimed in claim 1, wherein said recording medium has a lower reflection coefficient at a portion where recording light is already irradiated, and during said irradiating step, when the light quantity reflected from said one of said mark recording regions is discriminated as lower than said reference value, a discrimination is made that a mark is already written on said one of said mark recording regions.

4. An optical writing and reading method as claimed in claim 1, wherein said recording medium has a higher reflection coefficient at a portion where recording light is already irradiated, and during said irradiating step, when the light quantity reflected from said one of said mark recording regions is discriminated as higher than said reference value, a discrimination is made that a mark is already written on said one of said mark recording regions.

5. An optical writing and reading method as claimed in claim 1, wherein said reference value is obtained from a digital/analog converter having an input for receiving a voltage control signal, said voltage control signal being a digital data representing the light quantity irradiated on said recording medium.

6. An optical writing and reading method for writing a mark and data on a recording medium having a plurality of recording sections, each said recording section having a mark recording region and a subsequent data recording region, said mark indicating that said data is already written on said data recording region, said method comprising the steps of:
   irradiating light at a first power level on one of said mark recording regions regardless of whether a mark is already written on said one of said mark recording regions;
   discriminating, during said irradiating step, whether or not a mark is already written on said one of said mark recording regions, by comparing the light quantity of the light irradiated during said irradiating step and reflected from said one of said mark recording regions with a reference value, said reference value being obtained directly from a laser diode for emitting light to be irradiated on said recording medium;
   inhibiting the subsequent writing of data on one of said data recording regions of said first recording section when a discrimination is made that a mark is already written on said one of said mark recording regions; and
   irradiating the light so as to write data on said one of said data recording regions when a discrimination is made that a mark is not already written on said one of said mark recording regions.

7. An optical writing and reading method as claimed in claim 6, wherein said reference value is obtained directly from the light to be irradiated on said recording medium.

8. An optical writing and reading method as claimed in claim 6, wherein said reference value is obtained from a monitoring light emitted from said laser diode.

9. An optical writing and reading method as claimed in claim 1, wherein said method employs a one beam system utilizing one light beam for both writing and reading operations, said light beam having a larger power during writing, and said light beam having a smaller power during reading.

10. An optical writing and reading method as claimed in claim 1, wherein said method employs a two beam system utilizing two light beams having different frequencies, one of said light beams being used for verifying and reading the written data, said two light beams being respectively irradiated on said data recording region and on said mark recording region simultaneously.

11. An optical writing and reading method as claimed in claim 10, wherein the reflected write beam and the reflected read beam are separated by a dichroic mirror.

12. An optical writing and reading method as claimed in claim 1, wherein said method employs a two beam system utilizing two light beams having the same frequency, one of said light beams being used for writing and the other of said light beams being used for varifying and reading the written data, said two light beams being respectively irradiated on said data recording region and on said mark recording region simultaneously.

13. An optical writing and reading method as claimed in claim 12, wherein the reflected write beam and the reflected read beam are separated by a spatial filter.

14. An optical writing and reading apparatus for writing marks and data on an optical disk, comprising:
a recording medium having a plurality of recording sections, each of said recording sections having a mark recording region and a subsequent data recording region, a mark in said mark recording region indicating that said data is already written on said data recording region;
light irradiating means for irradiating light, of a write power level higher than a read power level, on said recording medium for writing said marks and said data;
light detecting means for detecting a light quantity reflected from said recording medium during writing of said marks;
reference voltage generating means for generating a reference voltage corresponding to a predetermined reflected light quantity;
comparing means for comparing said detected voltage with said reference voltage to provide an output signal indicating whether or not a mark is already written in said one of said mark recording regions; and
gate means, for inhibiting, in response to an output of said comparing means indicating that a mark is already written on said one of said mark recording regions, supply of said data to said light irradiating means.

15. An optical writing and reading apparatus as claimed in claim 14, wherein said mark is written by continuously irradiating light in said mark recording region for a period longer than any period of irradiation for writing data.

16. An optical writing and reading apparatus as claimed in claim 14, wherein said reference voltage generating means comprises a digital/analog converter for converting a reference digital voltage control signal into an analog voltage, said reference digital voltage control signal corresponding to the light quantity emitted from said light irradiating means.

17. An optical writing and reading apparatus for writing marks and data on an optical disk, comprising:
a recording medium having a plurality of recording sections, each of said recording sections having a mark recording region and a subsequent data recording region, a mark in said mark recording region indicating that said data is already written on said data recording region;
light irradiating means for irradiating light of a first power on said recording medium for writing said marks and said data;
light detecting means for detecting a light quantity reflected from said recording medium during writing of said marks;
reference voltage generating means for generating a reference voltage corresponding to a predetermined reflected light quantity, comprising:
a beam split prism for monitoring the light quantity emitted from a laser diode in said light irradiating means to said recording medium;
a photo detector for converting the light quantity monitored by said beam split prism into an electric signal; and
an amplifier for converting said electric signal output from said photo detector into said reference voltage;
comparing means for comparing said detected voltage with said reference voltage to provide an output signal indicating whether or not a mark is already written in said one of said mark recording regions; and
gate means, for inhibiting, depending on said output signal, supply of said data to said light irradiating means.

18. An optical writing and reading apparatus for writing marks and data on an optical disk, comprising:
a recording medium having a plurality of recording sections, each of said recording sections having a mark recording region and a subsequent data recording region, a mark in said mark recording region indicating that said data is already written on said data recording region;
light irradiating means for irradiating light of a first power on said recording medium for writing said marks and said data;
light detecting means for detecting a light quantity reflected from said recording medium during writing of said marks;
reference voltage generating means for generating a reference voltage corresponding to a predetermined reflected light quantity, comprising:
a photo detector, arranged to receive a monitoring light quantity emitted from a laser diode in said light irradiating means, said monitoring light quantity being emitted in a direction different from the direction of the light quantity emitted from said laser diode to said recording medium, said photo detector operatively converting said monitoring light quantity into an electric signal; and
an amplifier for converting said electric signal output from said photo detector into said reference voltage;
comparing means for comparing said detected voltage with said reference voltage to provide an output signal indicating whether or not a mark is already written in said one of said mark recording regions; and
gate means, for inhibiting in response to an output of said comparing means indicating that a mark is already written on said one of said mark recording regions, supply of said data to said light irradiating means.

19. An optical writing and reading apparatus as claimed in claim 14, wherein said apparatus employs a one beam system utilizing one light beam for both writing and reading operations, said light beam having a larger power during writing, and said light beam having a smaller power during reading.

20. An optical writing and reading apparatus as claimed in claim 14, wherein said apparatus employs a two beam system utilizing two light beams having different frequencies, one of said light beams being usedform writing and the other of said light beams being used for verifying and reading the written data, said two light beams being respectively irradiated on said data recording region and on said mark recording region simultaneously.

21. An optical writing and reading apparatus as claimed in claim 20 further comprising a dichroic mirror for separating the reflected read beam and the reflected write beam.

22. An optical writing and reading apparatus as claimed in claim 14, wherein said apparatus employs a two-beam system utilizing two light beams having the same frequency, one of said light beams being used for verifying and reading the written data, said two light beams being respectively irradiated on said data recording region and on said mark recording region simultaneously.

23. An optical writing and recording apparatus as claimed in claim 22 further comprising a spatial filter for separating the reflected read beam and the reflected write beam.

* * * * *